Jan. 4, 1949.  O. L. ALTENBERG  2,457,799
INSTRUMENT FOR DETECTING STRAIN IN TRANSLUCENT MATERIALS
Filed Jan. 28, 1946

INVENTOR.
ORVILLE L. ALTENBERG
BY
*M. O. Hayes*
ATTORNEY

Patented Jan. 4, 1949

2,457,799

UNITED STATES PATENT OFFICE 2,457,799

INSTRUMENT FOR DETECTING STRAIN IN TRANSLUCENT MATERIALS

Orville L. Altenberg, Long Beach, Calif.

Application January 28, 1946, Serial No. 643,952

1 Claim. (Cl. 88—14)

(Granted under the act of March 3, 1883, as amended April 30, 1928; 370 O. G. 757)

This invention relates to glass testing instruments and more particularly to reflecting type polariscopes.

Assembled glass windows or plates on devices, such as telescopes, fire control equipment, compasses, etc., frequently contain mechanically impressed stresses or strains which are caused by unequal pressure on the gasket or assembly screws. Manifestly, these stresses or strains are detrimental and the detection of the same is highly desirable. Normally, this detection is accomplished by placing the glass between a pair of polarizing elements whose planes of polarization are set at right angles, whereby stress or strain may be recognized by a subtle emission of feathery light. However, this method cannot be employed when the glass is mounted so as to be incapable of being placed between the polarizing elements.

Therefore, an object of the invention is to provide improved means for reflecting polarized light rays through glass in order to detect mechanically impressed stresses or strains in the glass.

Other objects of the invention are to provide an improved instrument having an element for directing polarized light rays through glass at an angle which causes the rear surface of the glass to act as a mirror so as to reflect said light rays through a second polarizing element set at substantially a right angle to the first element, whereby excessive stress or strain areas may be detected by the emission of feathery light; to provide an improved instrument, of the character described, wherein one of the polarizing elements is adjustably mounted to permit variation of the angles of incidence and reflection of the light rays and thereby facilitate checking of mounted or assembled glass windows or covers; and to provide improved elements and arrangements thereof in a glass testing instrument of the character described and for the purposes set forth.

In accomplishing these and other objects of the present invention, I have provided improved details of structure, the preferred form of which is illustrated in the accompanying drawing, wherein.

Figure 1:
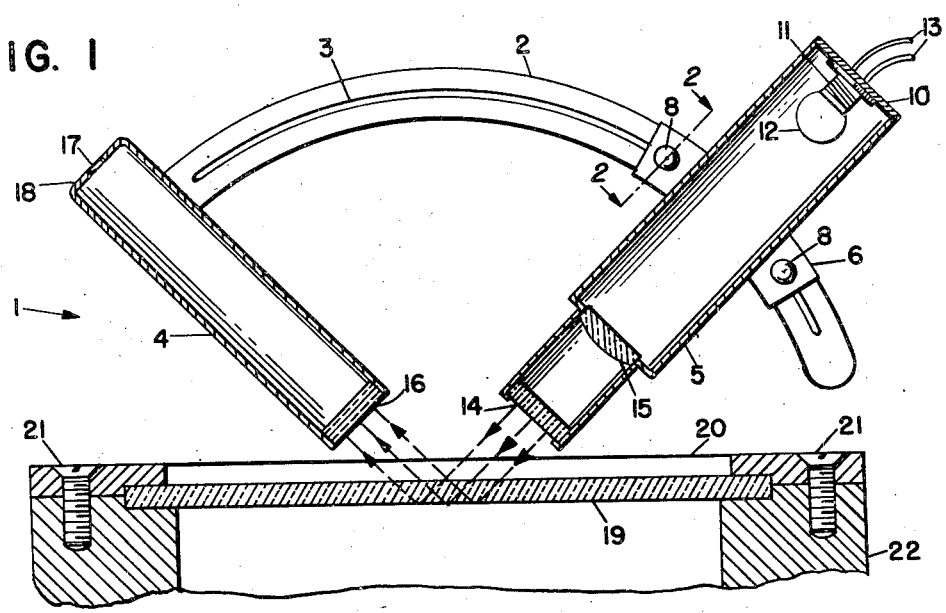
Fig. 1 is a plan view, partly in section, of an instrument embodying the features of the present invention and showing testing relation to the glass cover of a device.

Referring more in detail to the drawing:

In Fig. 1, the numeral 1 designates an instrument which includes an arcuate, metallic guide member or bracket 2 having a longitudinal opening or slot 3 formed therein and terminating short of its ends. A pair of cylindrical housings or tubes 4 and 5, of metal or other suitable material, are mounted on, or supported by, the bracket 2 and extend in a plane parallel thereto and radially of the axis about which said bracket is curved. The tube 4 is preferably stationary and is rigidly secured to one end of the bracket, while the tube 5 is movable longitudinally of said bracket and relative to said tube 4.

Figure 2:
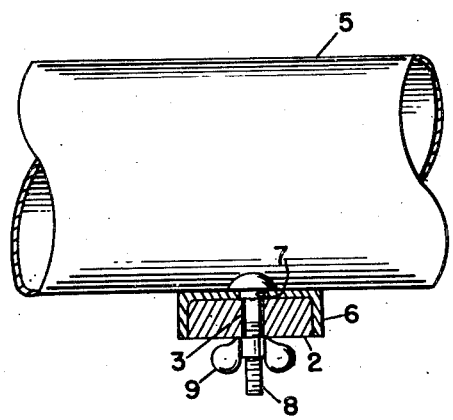
Fig. 2 is an enlarged, transverse, sectional view, taken on the line 2—2 of Fig. 1.

For fastening the tube 5 to the bracket 2 in adjusted positions, a channel-shaped clamp 6 is secured to the underside of said tube (Fig. 2) and is curved or arced complementary to the curvature of said bracket so as to have a sliding fit thereupon. Suitable openings 7 are formed in the clamp 6 for receiving short bolts 8 which depend through the bracket slot 3 and receive wing nuts 9 upon their lower ends (Fig. 2). Loosening of the nuts 9 permits arcuate movement of the tube 5, said tube being fixed in position by tightening said nuts.

The tube 5 is preferably of greater diameter than the tube 4 and has its outer end closed by a circular plate or disc 10. An electrical socket 11, for supporting an electrical lamp 12, is mounted internally and axially of the plate 10 and lead wires 13 extend from the socket to a source (not shown) of electrical energy. The inner end of the adjustable tube is of reduced diameter and a circular element, or plate 14, of polarizing glass or other suitable material, is mounted transversely in said reduced inner end. Adjacent the plate 14 is positioned a lens 15 for condensing and directing light rays emitted by the lamp 12 through said plate.

An element or plate 16, similar to the plate 14, is mounted diametrically in the inner end of the tube 4 for receiving reflected polarized light rays projected by the tube 5, as will be hereinafter explained. The plates have their polarization planes set at right angles, whereby the reception of reflected polarized light rays is normally blocked by the plate 16. An axial sight opening 17 is formed in the outer end disc or closure 18 of the tube 4.

The instrument 1 is adapted to be employed in detecting mechanically impressed stresses or strains in glass mounted as covers or windows upon various devices such as telescopes, fire control equipment, compasses, etc. A typical installation is illustrated in Fig. 1 and includes a sheet or plate of glass 19 confined by a frame 20 and screws 21 upon a device 22.

Operation

The operation of an instrument constructed as described is as follows:

As shown in Fig. 1, the instrument 1 is positioned adjacent and in angular relation to the glass 19 and is preferably supported manually with the tubes 4 and 5 extending in a plane perpendicular to the plane in which said glass is disposed. It is preferable that the tubes be arranged at substantially a right angle to each other and that the light projecting tube 5 be positioned at an angle between 40° and 50° to the front or external surface of the glass. Since the angle of reflection is always equal to the angle of incidence, the angle between the tubes may be less or greater than 90° when the projecting tube is disposed at an angle to the glass greater or less than 45°. By loosening the wing nuts 9, the clamp 6 may be moved relative to the bracket 2 so as to vary the angular relation of the projecting tube 5 to the receiving tube 4.

As is well-known, areas of excessive stress or strain may be detected by placing glass to be tested between a pair of polarizing elements whose polarization planes are set at right angles. When light rays are directed through the elements and glass, areas of excessive stress or strain in the glass distort the polarized light rays by rotating the plane of polarization and cause an emission of feathery light. However, there is no transmission of light without the existence of stress or strain areas.

The construction of the described instrument permits this detection of excessive stress or strain by observing reflected polarized light rays. With the tubes in the proper angular relation to each other and the glass 19, the light rays projected by the lamp 12 and lens 15 through the plate 14 of the tube 5 strike said glass at an angle and the rear or inner surface of the glass functions as a mirror to reflect said polarized light rays through the polarized plate 16 of the tube 4. If the glass is under excessive stress or strain, the polarization plane of the light rays is twisted and feathery light is visible through the sight opening 17 of the receiving tube. By merely moving the instrument in a plane parallel to the front surface of the glass, the entire area thereof may be readily checked for stress or strain.

While I have shown but one embodiment of my invention, it is susceptible to modification without departing from the spirit of the invention. I do not wish, therefore, to be limited by the disclosures set forth, but only by the scope of the appended claim.

The invention described herein may be manufactured and used by or for the Government of the United States of America for governmental purposes without the payment of any royalties thereon or therefor.

I claim:

An instrument for detecting mechanically impressed strains in translucent materials including an arcuate guide bracket, a cylindrical light projecting tube overlying the bracket and having its longitudinal axis disposed radially of the arc about which said bracket is curved, clamp means for adjustably fastening the tube to the bracket whereby said tube is movable through an arcuate path longitudinally of said bracket, an electrical lamp in the outer end of the tube, a plate of polarizing material closing the inner end of said tube, a lens interposed between the lamp and plate for condensing and directing light rays from said lamp through said plate, a cylindrical light receiving tube carried by one end of the bracket and having its longitudinal axis disposed radially of the arc about which said bracket is curved, the receiving tube being disposed in the plane of movement of the projecting tube and having an axial sight opening in its outer end, and a plate of polarizing material closing the inner end of said receiving tube, said plates of polarizing material having their polarization planes set substantially at right angles, said tubes being positionable with respect to a sheet of translucent material so that emitted polarized light rays are directed at an angle through the translucent material to be tested and reflected into said light receiving tube, the presence of stresses being detectable by the reflection of feathery light.

ORVILLE L. ALTENBERG.

REFERENCES CITED

The following references are of record in the file of this patent:

UNITED STATES PATENTS

| Number | Name | Date |
|---|---|---|
| 1,949,619 | Pfund | Mar. 6, 1934 |
| 2,119,577 | Gray | June 7, 1938 |
| 2,174,269 | Land | Sept. 26, 1939 |
| 2,208,882 | Graff et al. | July 23, 1940 |
| 2,406,166 | Scott | Aug. 20, 1946 |

OTHER REFERENCES

"Surface Layer of Sheet Glass," by F. L. Bishop, Jr., in Journal of the American Ceramic Society for May 1944—pages 145–148.